Oct. 8, 1935.   J. H. BARNES   2,016,883
BRAKE DRUM
Original Filed Nov. 17, 1931
FIG.1
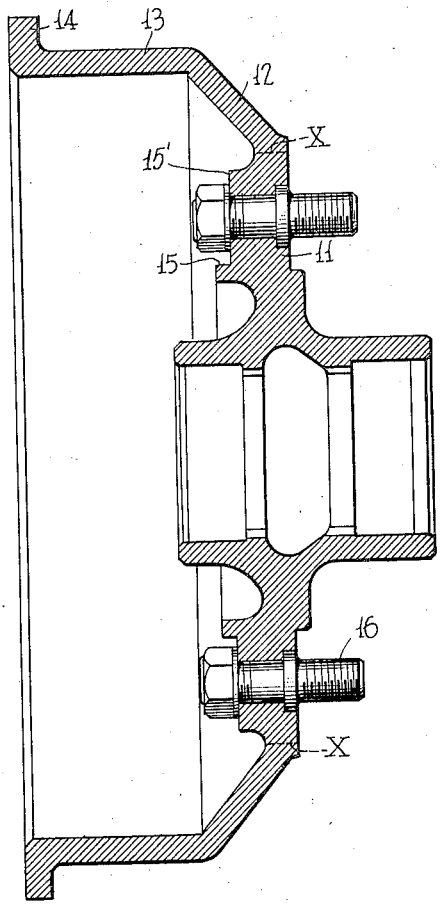
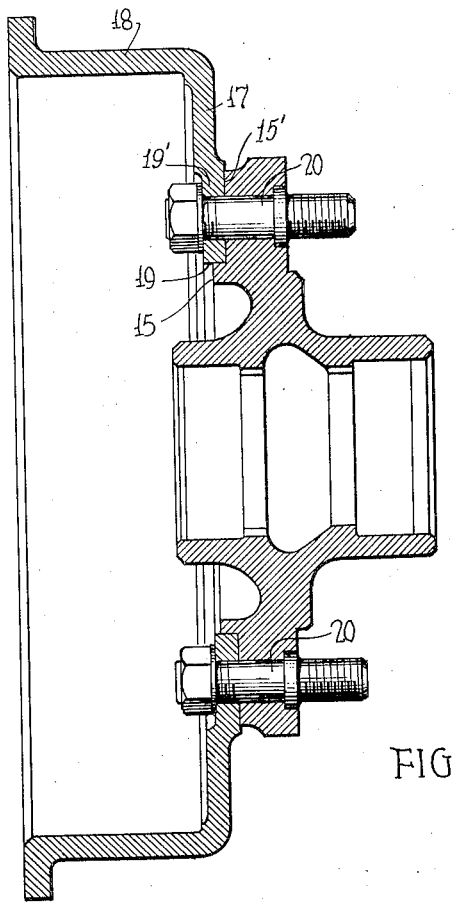
FIG.2
INVENTOR.
JAMES H. BARNES.
BY
ATTORNEY.

Patented Oct. 8, 1935

2,016,883

UNITED STATES PATENT OFFICE 2,016,883

BRAKE DRUM

James H. Barnes, Detroit, Mich., assignor to Budd Wheel Company, Philadelphia, Pa., a corporation of Pennsylvania Substitute for application Serial No. 575,521, November 17, 1931. This application April 27, 1934, Serial No. 722,622

1 Claim. (Cl. 188—218)

This application is a substitute for my earlier application Serial No. 575,521, filed November 17, 1931.

My invention relates to the art of brake drums and it has been my particular object to provide an integral hub and drum construction affording an arrangement whereby the drum portion may be readily replaced in case it becomes worn. One of the primary objections to combined hub and drum constructions of the prior art has been the necessity of discarding the entire structure when the friction surface of the drum alone has become worn. I have sought to remedy this objection by devising a hub and drum arrangement affording provision for the location of a separate drum against the hub portion of the composite hub and drum in case the original braking surface becomes worn. A further aspect of my invention relates to the method whereby the used drum surface may be removed and a new one substituted.

Further objects and advantages of my invention will be obvious from a reading of the subjoined specification, in the light of the attached drawing, in which, Fig. 1 is a central axial sectional view through my improved composite hub and drum, and Fig. 2 is a view similar to Fig. 1 illustrating the removal of the original drum surface on this composite article and the replacement thereof in accordance with my invention by a separate brake drum.

Referring to the drawing by reference characters, the numeral 10 indicates the hub of my invention. This hub is provided in conventional fashion with a radially extending brake flange 11 terminating in a conically extending portion 12 which is in turn flanged axially inwardly at 13 and radially outwardly at 14 to constitute an axially extending brake drum surface terminating in a stiffening flange. In accordance with my invention I form an annular axially extending ledge or abutment 15 and a radial seating abutment 15' on the inner side of the flange 11 of the composite hub and drum. A plurality of threaded studs 16 are secured to the hub flange 11 through openings therein extending annularly thereabout in a zone radially outwardly spaced from the annular ledge 15. These studs serve to secure the wheel body in place against the outer side of the hub flange through their coaction with nuts which engage the threaded shanks of the studs outwardly of the wheel body and abut the face of the wheel body to effect its securement.

In the practice of my invention, when the braking surface 13 becomes worn, the drum portion of the composite article is machined off along an annular line, as indicated at X and a special drum 17 seated upon the annular axially extending ledge 15 and the radial seating abutment 15' and secured thereto by special studs 20 which are longer than the studs furnished with the composite hub and drum as original equipment and which serve to secure the separate drum 17 in place. This separate drum is formed with an annular seating portion 19 adapted to seat against and be centered by the ledge 15 of the hub flange, a radial flange portion 19' seating against the radial seating abutment 15 of the hub flange, and is further provided with an axially extending flange 18 adapted to constitute the braking surface of the drum. It will thus be obvious that I have devised a superior composite drum and an improved method of replacing the braking surface thereof.

Modifications will be obvious to those skilled in the art and I do not therefore wish to be limited except by the scope of my sub-joined claim as interpreted in the light of the generic spirit of my invention.

What is claimed is:

A composite hub and drum comprising a barrel portion, a radially extending flange portion and an axially extending braking portion constituting a continuation of said flange portion, all an integral one piece fabrication, said flange portion being provided additionally with axial aligning and radial seating abutment means for a replacement drum.

JAMES H. BARNES.